Patented Nov. 11, 1952

2,617,731

UNITED STATES PATENT OFFICE 2,617,731

METHOD OF SEPARATING BUTTERFAT FROM GLOBULES THEREOF

Stuart Patton and Charles M. Stine, State College, Pa., assignors, by mesne assignments, to The Pennsylvania Research Corporation, a corporation of Pennsylvania No Drawing. Application April 18, 1951, Serial No. 221,723

8 Claims. (Cl. 99—119)

This invention relates to the separation of butterfat from globules thereof that are suspended in a liquid medium or serum such as milk, or cream that has been separated from milk.

Butterfat globules are of general spherical shape and range in size from about two to about twenty microns in diameter. The inner core of the globule contains the constituents of butterfat and is surrounded by other materials, an outer layer of which is of phospholipids and proteins which forms a proteinaceous membrane that is the principal barrier to coalescence or merging of the butterfat globules.

Butterfat, or butter oil which is melted unctuous butterfat, is the principal constituent of commercial butter made by churning, the chief difference between the two being that butter produced by churning includes some of the proteinaceous material of butterfat globules, and small quantities of milk serum. This is due to the fact that in making butter by churning whole milk, or cream separated from it, the butterfat globules coalesce to form bodies that may vary in size, roughly comparable to that of grains of wheat to that of peas, and which occlude other milk constituents. These coalesced bodies are suitably separated from the churned serum, washed and worked into a homogeneous mass with or without the addition of salt to form commercial butter which contains some of the proteinaceous material of the butterfat globules, as well as some of the milk or cream serum. These latter materials are susceptible to microbiological attack, which is a principal reason for the tendency of butter to spoil and become rancid.

The object of this invention is to provide a practical and efficient, low-cost method of separating butterfat from globules thereof, and removing the separated butterfat from the serum that contained the butterfat globules, whereby relatively large percentages of the available butterfat in substantially pure form are removed.

In the practice of this invention in its applicability to recovering butterfat from normal milk serum, although it may be removed from other serums containing it, the major portion of its butterfat content is separated from the milk by passing it through a conventional cream separator to remove cream containing, preferably, 40 or more percent of butterfat, which in the globular form explained is in the dispersed phase of a milk or cream emulsion. Proteinaceous membranes of butterfat of the cream are removed or dispersed from the globules to permit the butterfat constituents thereof to coalesce by thoroughly mixing with the cream one or more of an organic compound or compounds of the group having chemical, and physical or functional, characteristics presently to be explained. The organic compounds so mixed with the cream are, in effect, de-emulsifying agents which disperse in various ways proteinaceous membranes of the butterfat globules that are the principal barrier to coalescence or merging of the butterfat content of the many dispersed globules.

This invention is predicated, in part, upon our discovery that the effective agents for this purpose are organic compounds of the group in which molecules thereof contain carbon atoms from 3 through about 10 in number, and also contain hydrogen, and which materially lower the interfacial tension between the continuous phase material of the liquid medium or cream emulsion and the butterfat within the globules that are suspended in the dispersed phase of the emulsion. Examples of such compounds will presently be explained.

To permit coalescence of the butterfat constituents of the globules which have their proteinaceous membranes dispersed by the organic compound or compounds added to the mixture, the mixture is heated to a temperature of not less than about 120° F. and below its boiling point. This heating of the mixture melts the butterfat constituents or the globules thereof so that such constituents merge with each other to form butter oil, which is thereafter suitably separated from the remainder of the mixture. While in some cases the mixture may be heated to a temperature as low as 120° F. it is preferably heated to a temperature of not less than about 135° F. This elevated temperature is maintained until the released butter oil is separated from the remainder of the mixture. Thereafter the butter oil is preferably washed with hot water, which may be at a temperature of about 180° F., and centrifuged through a cream separator to remove any impurities that may be present, including such small portion of the de-emulsifying organic compound as may not remain in the serum.

Specific typical examples of organic compounds that may, in the practice of this invention, be mixed with butterfat emulsions, specifically cream, to effect quantitative, or in other words high percentage recoveries of butterfat are isopropyl alcohol ($C_3H_7OH$), n-butyl alcohol ($C_4H_9OH$), diethyleneglycol monobutyl ether ($C_8H_{18}O_3$), propionic acid ($C_3H_6O_2$), n-butyric acid ($C_4H_8O_2$), n-caproic acid ($C_6H_{12}O_2$), n-butyl amine ($C_4H_{11}N$), isoamyl amine ($C_5H_{13}N$), methyl ethyl ketone ($C_4H_7O$) and Tergitol-7, which is a trade name for a de-emulsifying mixture having as its active agents for the purpose of this invention diethylene glycol monobutyl ether ($C_8H_{18}O_3$) and sodium 3, 9 diethyl tridecyl-6-sulphate ($C_{17}H_{35}SO_4Na$). All of these compounds contain polar groupings, and we now believe that the action of all organic compounds operable in the practice of this invention is dependent on the presence of groupings that are polar or at least exert some polar action.

The following procedures for the practice of the invention are given by way of example, and not of limitation.

*Example 1.*—To 17 pounds of raw cream containing 46.5% butterfat there were added 9 fluid ounces of Tergitol-7, described above, and the mixture was stirred while its container was in a water bath heated to a temperature of about 180° F. for about fifteen minutes. After removing the container and permitting it to stand for about 10 minutes, the butter oil released by the procedure separated from and floated on top of the remaining aqueous material of the cream. The aqueous lower layer was removed by siphoning, but the floating butter oil may readily be removed by decanting or by passing the entire mixture through a cream separator. The crude butter oil was then passed through a conventional cream separator which had previously been heated to the usual temperature for, and so adjusted as would normally be done, to recover plastic cream from milk. Clear butter oil having a high degree of purity was collected at the cream outlet of the separator, while a very small amount of milk-colored liquid drained from the skim milk outlet of the separator. The butter oil was washed with hot water at a temperature of about 180° F. and again passed through the cream separator which had previously been cleaned. The yield, excluding fat that remained in the separator and was not reclaimed, was 7 pounds, 3 ounces, or in excess of 90% based on the butterfat content of the cream.

*Example 2.*—To 16 pounds of raw cream containing 40.0% butterfat were added 25 fluid ounces of n-butyl alcohol. This mixture after being processed in the same manner as described in Example 1, yielded 6 pounds, 0 ounces of butter oil, or in excess of 90% based on the butterfat content of the cream.

*Example 3.*—To 16.5 pounds of raw cream containing 42.0% butterfat were added 25 fluid ounces of diethyleneglycol monobutyl ether. This mixture, after being processed in the same manner as described in example 1 yielded 6 pounds, 7 ounces of butter oil, or in excess of 90% based on the butterfat content of the cream.

*Example 4.*—To 16 pounds of raw cream containing 40.5% butterfat were added 25 fluid ounces of n-butyric acid. This mixture, after being processed in the same manner as described in example 1, yielded 6 pounds, 2 ounces of butter oil which yield is also in excess of 90% of the fat originally present in the cream.

In tests that we have made in determining what demulsifying agents may be used in the practice of our invention, we have found, for example, that sodium hydroxide (NaOH) when used in sufficient concentration to de-emulsify, substantially completely saponifies the butterfat which fact renders this agent useless. Sodium chloride (NaCl) was found to have no de-emulsifying power up to 10% of the weight of the cream. We also found that concentrated hydrochloric acid (HCl) when added at not less than 30% by weight of the cream, de-emulsified the cream by substantially digesting the proteins of the cream, rendering the serum phase essentially useless.

The butter oil recovered in the practice of this invention is substantially pure, free from the deleterious effect of milk serum materials present in commercial churned butter, and may be stored at room temperatures for long periods of time without becoming rancid or otherwise spoiled or impaired as a result of microbiological action. It may be used to make butter, the same as commercial butter produced by churning, by adding milk serum constituents and salt to it, or by merely adding milk serum constituents if sweet butter is desired. Butter oil recovered in the practice of this invention is also entirely suitable as a source of butterfat in the formulation of ice cream mixes, and in the reconstitution of non-fat dry milk to whole milk.

According to the provisions of the patent statutes, we have explained the principle of our invention and its mode of operation, and have given specific examples of how it may be practiced. However, we desire to have it understood that, within the scope of the appended claims, the invention may be practiced otherwise than the specific examples we have described.

We claim as our invention:

1. The method of separating butterfat from globules thereof that are suspended in a liquid medium, comprising dispersing proteinaceous membranes of such globules to permit butterfat constituents thereof to coalesce by mixing with said globule-containing medium at least one organic compound containing from 3 to 10 carbon atoms, inclusive, together with hydrogen and an element from the group consisting of oxygen and nitrogen, said compound being soluble in said medium and materially lowering interfacial tension between said medium and butterfat within said globules, heating the mixture to a temperature of not less than about 120° F. and below the boiling point thereof whereby butterfat constituents of said globules are melted and merged with each other to form butter oil, and thereafter separating such oil from the remainder of the mixture.

2. The method of separating butterfat from globules thereof that are suspended in cream, comprising dispersing proteinaceous membranes of such globules to permit butterfat constituents thereof to coalesce by mixing with said cream at least one organic compound containing from 3 to 10 carbon atoms, inclusive, together with hydrogen and an element from the group consisting of oxygen and nitrogen, said compound being soluble in said medium and materially lowering interfacial tension between the cream and butterfat within said globules, heating the mixture to a temperature of not less than about 135° F. and below the boiling point thereof whereby butterfat constituents of said globules are melted and merged with each other to form butter oil, and thereafter separating such oil from the remainder of the mixture.

3. The method of separating butterfat from globules thereof that are suspended in cream, comprising dispersing proteinaceous membranes of such globules to permit butterfat constituents thereof to coalesce by mixing with said cream at least one organic compound containing from 3 to 10 carbon atoms, inclusive, together with hydrogen and an element from the group consisting of oxygen and nitrogen, said compound being soluble in said medium and materially lowering interfacial tension between the cream and butterfat within said globules, heating the mixture to a temperature of not less than about 135° F. and below the boiling point thereof whereby butterfat constituents of said globules are melted and merged with each other to form butter oil, separating such oil from the remainder of the so-heated mixture, washing the butter oil with water at a temperature of not less than about 135° F. and below the boiling point thereof, and separating the washed butter oil from such water and its content of impurities washed from the butter oil.

4. A method according to claim 1, said organic compound being n-butyl alcohol.

5. A method according to claim 1, said organic compound being diethyleneglycol monobutyl ether.

6. A method according to claim 1, said organic compound being propionic acid.

7. A method according to claim 1, said organic compound being methyl ethyl ketone.

8. A method according to claim 1, said organic compound being diethyleneglycol monobutyl ether having mixed therewith sodium 3, 9 diethyl tridecyl-6-sulfate.

STUART PATTON.
CHARLES M. STINE.

REFERENCES CITED

The following references are of record in the file of this patent:

UNITED STATES PATENTS

| Number | Name | Date |
|---|---|---|
| 2,404,034 | Buxton | July 16, 1946 |
| 2,461,117 | Lindgren | Feb. 8, 1949 |
| 2,547,281 | Petty | Apr. 3, 1951 |